May 31, 1960    F. L. WILLMAN    2,938,746
HANDLE FOR BARREL BOLTS AND CATCHES
Original Filed Dec. 19, 1955
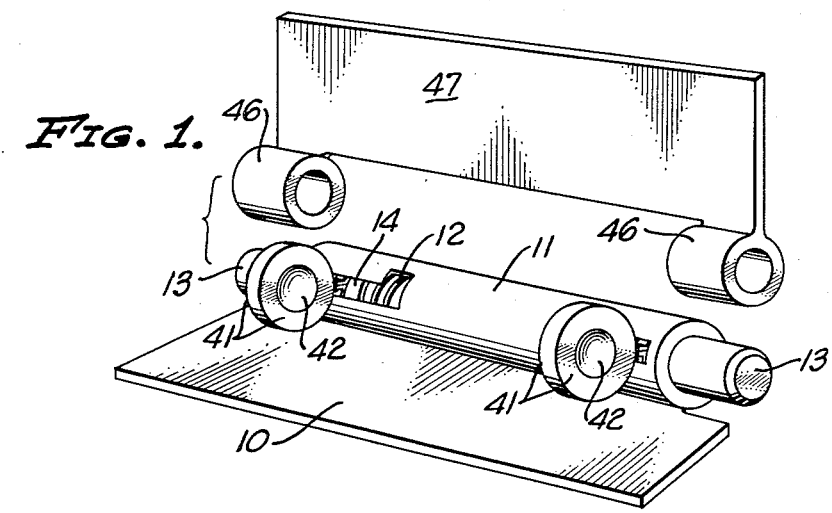
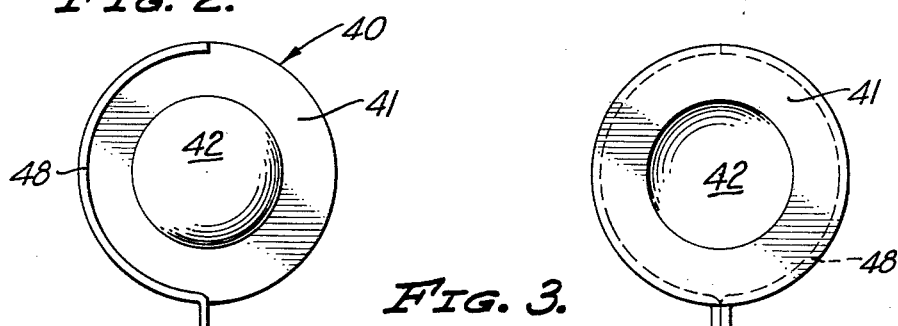
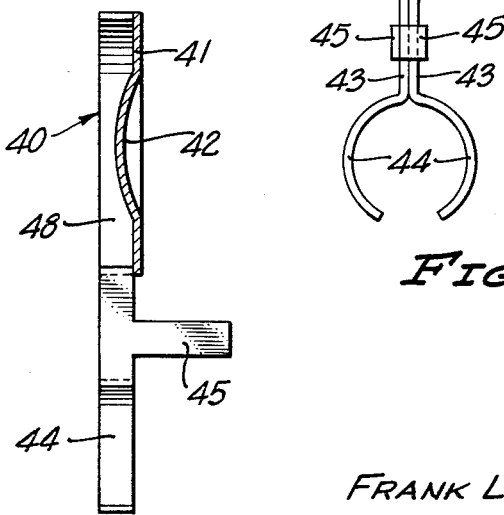
INVENTOR.
FRANK L. WILLMAN
BY
ATTORNEY

United States Patent Office 2,938,746
Patented May 31, 1960

2,938,746

HANDLE FOR BARREL BOLTS AND CATCHES

Frank L. Willman, 1859 Blake Ave., Los Angeles, Calif.

Original application Dec. 19, 1955, Ser. No. 553,828, now Patent No. 2,843,412, dated July 15, 1958. Divided and this application May 19, 1958, Ser. No. 736,195

6 Claims. (Cl. 292—336.3)

This invention relates to a handle which is particularly adapted for use with barrel bolts, catches and similar fastening devices.

This application is a divisional application of application Serial No. 553,828 filed December 19, 1955, now Patent No. 2,843,412.

It is an object of my invention to provide a new and improved handle construction for the plungers of barrel bolts and catches, which handle construction is particularly adapted for use with plungers of relatively small diameter. The handle constructions which are presently in use on such devices do not adapt themselves to efficient use in connection with a small diameter plunger.

It is a further object of my invention to provide such a handle which is strong and which is also easy to assemble and to attach to the plunger. The parts used to form my device and their method of assembly and attachment to the plunger and to each other are novel in the art.

It is more particularly an object of my invention to provide a handle of the type described which attaches to the plunger in such a manner that it does not enlarge the diameter of the plunger and thus, in the case of a barrel bolt or catch, does not interfere with the reciprocal movement of the plunger along the barrel.

It is also among the objects of my invention to provide a handle of the type described in which only one fastening operation is required to assemble the handle and simultaneously secure it to the plunger. The fastening operation may comprise a simple spot welding of two contacting surfaces.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

Fig. 1 is a perspective view of a complete double-action barrel bolt separated from the receiving means, showing my handles in use;

Fig. 2 is a front elevational view of the handle half of my invention;

Fig. 3 is a side elevational view of the handle half shown in Fig. 2;

Fig. 4 is a front elevational view of a complete handle formed by combining two of the halves shown in Figs. 2 and 3.

One embodiment which has been selected to illustrate my invention is adapted to be used in connection with a conventional spring-action catch or barrel bolt. The barrel bolt structure includes a plate 10, the lower end of which is curved back on itself to form a cylindrical hollow barrel 11, which extends along one edge of the plate 10.

Mounted within the center portion of the barrel 11 is a coil spring 12, the opposite ends of which exert outwardly directed pressure against the inner ends of a pair of elongated cylindrical plungers 13, which are reciprocally mounted within the barrel 11, adjacent the opposite ends thereof. The barrel 11 is provided adjacent its ends with a pair of substantially L-shaped slots 14, the longer portion of which extends longitudinally with respect to the barrel 11.

The coil spring 12 normally urges the plungers 13 so that their ends extend outwardly from the opposite ends of the barrel 11. The slots 14 are provided for connection of the plunger handles which permit manual retraction of the plungers 13 back into the barrel 11 against the pressure of coil spring 12 to release the catch.

The above described structure is that of a conventional double action barrel bolt or spring biased catch. Such devices are also constructed with only a single plunger, as well. The novelty of my invention lies in the construction and method of attachment of the handle to the plunger or plungers.

With my invention, the number of parts forming the handle has been reduced to two identically formed handle halves 40, which are preferably formed of metal. Each of the handle halves 40 has an integral upper portion 41, which is substantially circular in shape and has an integral substantially right angular flange 48 extending around one half of its periphery. The center of the upper portion 41 is provided with a recessed hemispherical portion 42.

The bottom surfaces of the hemispherical portions 42 are provided with small slightly flattened areas at their centers, which are brought into close proximity to each other when two handle halves 40 are assembled to form a complete handle. The handle halves 40 can thus be permanently attached to each other by spot welding the flat areas together, an operation which is easily and rapidly accomplished from the outside of the handle halves 40.

Extending radially outwardly from the upper portion 41 is a straight portion 43, at the opposite end of which is a small arcuate portion 44. The straight portion 43 and arcuate portion 44 extend in a plane at right angles to the upper portion 41 and in the same plane as the flange 48. An integral bend tab 45 extends outwardly from the straight portion 43 in the same plane.

The plunger 13 of the barrel bolt is provided with a circumferential groove 20, which extends to a depth at least equal to the thickness of the arcuate portions 44. My handle is attached to the plunger 13 by mounting the arcuate portions 44 of the two handle halves 40 in the groove 20 on opposite sides of the plunger 13. The handle halves 40 are then fastened together by bending the bend tabs 45 around the straight portions 43. Additional fastening means may also extend through the hemispherical portions 42 or such portions may be spot welded together in the manner described above.

My handle is thus attached to the plunger 13 so that the straight portions 43 extend through the slot 14 in the barrel 11. The portions 41 may easily be gripped by the fingers to move the handle inwardly against the action of the coil spring 12. When the straight portions 41 reach the inner end of the longitudinal portion of the slot 14, the end of the plunger has been withdrawn into the end of the barrel 11. If the plunger is to be locked in retracted position, the straight portions 43 are moved into the connecting transverse portion of the slot 14, the edge of which prevents outward movement of the handle. The plungers 13 are adapted to removably fit within the hollow portions 46 of a second plate 47, shown in the upper part of Fig. 1, or any other suitable receiving means.

I claim:

1. A handle for barrel bolts having a reciprocal plunger with an annular groove, said handle comprising a pair of identically formed handle halves, each of said handle halves including an integral circular handle portion, said handle portion having an inwardly directed flange extending around substantially one half of its periphery, said handle portion having an inwardly directed hemispherical portion adjacent the center thereof, said handle portion having an integral straight portion extending radially from said handle portion, one end of said straight portion being disposed adjacent one end of said flange, said straight portion having an integral arcuate portion at its opposite end, said arcuate portion being between a quarter and half portion of a circle, and a tab extending outwardly at substantially a right angle from said straight portion, said halves adapted to be disposed adjacent each other with said inwardly directed portions directed toward each other, said flanges combining to provide a substantially continuous circular flange extending around the periphery of said handle portions, said arcuate portions adapted to fit within and extend around the annular groove, the tab of each of said halves adapted to be bent around the straight portion of the other of said halves to hold said halves together to form a handle and to retain said arcuate portions in the groove to secure the handle so formed to the plunger, said inwardly directed hemispherical portions providing indentations on the opposite sides of the handle so formed for manually gripping the handle.

2. A handle for barrel bolts having a reciprocal plunger with an annular groove, said handle comprising a pair of identically formed handle halves, each of said handle halves including a circular handle portion, said handle portion having an inwardly directed flange extending around substantially one half of its periphery, said handle portion having an integral straight portion extending outwardly from said handle portion, said straight portion having an integral arcuate portion at its opposite end, and a tab secured at one end to said straight portion, said halves adapted to be disposed adjacent each other with said inwardly directed flanges directed toward each other, said flanges combining to provide a substantially continuous circular flange extending around the periphery of said handle portions, said arcuate portions adapted to fit within and extend around the annular groove, the tab of each of said halves adapted to be bent around the straight portion of the other of said halves to hold said halves together to form a handle and to retain said arcuate portions in the groove to secure the handle so formed to the plunger.

3. A handle for barrel bolts having a reciprocal plunger with a groove, said handle comprising a pair of identically formed handle halves, each of said handle halves including a handle portion, a portion extending outwardly from said handle portion, said outwardly extending portion having an arcuate portion at its opposite end, and a tab secured at one end to said outwardly extending portion, said halves adapted to be disposed adjacent each other, said arcuate portions adapted to fit within and extend around the groove, the tab of each of said halves adapted to be bent around the outwardly extending portion of the other of said halves to hold said halves together to form a handle and to retain said arcuate portion in the groove to secure the handle so formed to the plunger.

4. A handle for barrel bolts having a reciprocal plunger with a groove, said handle comprising a pair of handle halves, each of said handle halves including a handle portion and an arcuate portion spaced from said handle portion, at least one of said handle halves having a tab secured at one end thereof to said handle half, said halves adapted to be disposed adjacent each other with said arcuate portions fitting within the groove, said tab adapted to be bent around the other handle half between the handle portion and arcuate portion thereof to hold said halves together to form a handle and to retain said arcuate portions in the groove to secure the handle so formed to the plunger.

5. A handle for barrel bolts having a reciprocal plunger with a groove, said handle comprising a pair of handle halves, each of said handle halves including a handle portion and an arcuate portion, said halves adapted to be disposed adjacent each other with said arcuate portions fitting within the groove, and means carried by at least one of said handle halves and engageable with the other of said handle halves for securing said handle halves together to form a handle and to retain said arcuate portions in the groove to secure the handle so formed to the plunger.

6. A handle for barrel bolts having a reciprocal plunger, said handle comprising a pair of handle halves, each of said handle halves including a handle portion and an arcuate portion, said halves adapted to be disposed adjacent each other with said arcuate portions arranged to fit around said plunger, and means carried by at least one of said handle halves and engageable with the other of said handle halves for securing said handle halves together to form a handle and to retain said arcuate portions around the plunger to secure the handle so formed to the plunger.

References Cited in the file of this patent

UNITED STATES PATENTS

| | | |
|---|---|---|
| 242,281 | Debacher | May 31, 1881 |
| 2,452,377 | Houseman | Oct. 26, 1948 |
| 2,547,315 | Gray | Apr. 3, 1951 |